Aug. 27, 1968   T. GUTERMANN ET AL   3,398,898
FLAME SCARFING TORCH HEAD

Filed Dec. 20, 1966   2 Sheets-Sheet 1

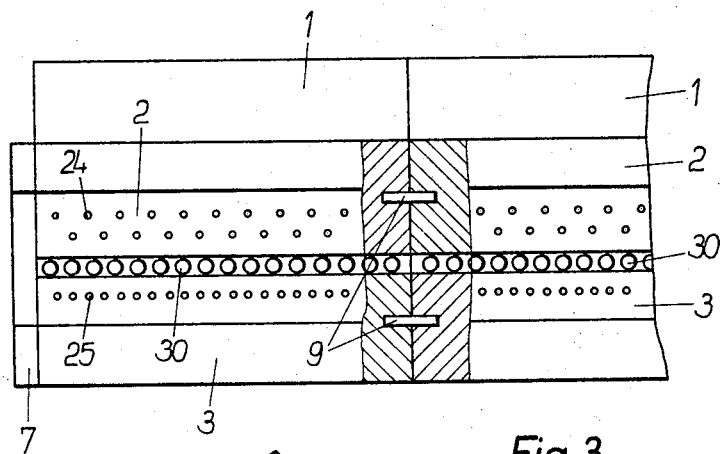
Fig. 3
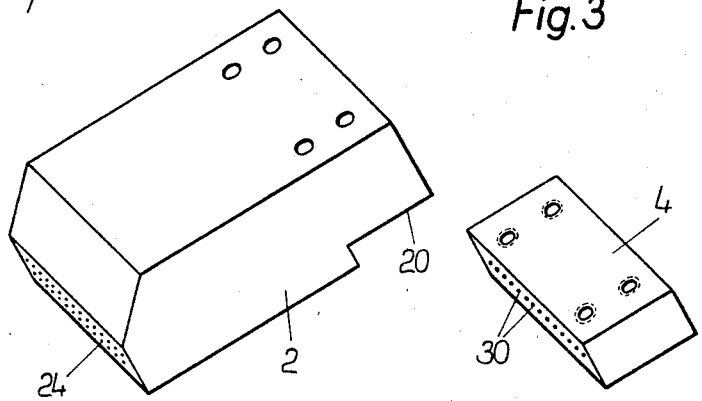
Fig. 4
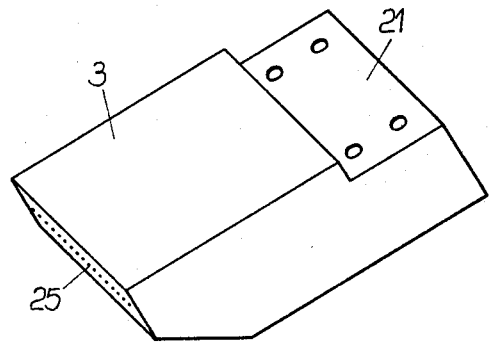

United States Patent Office 3,398,898
Patented Aug. 27, 1968

3,398,898
FLAME SCARFING TORCH HEAD
Traugott Gutermann and Dieter Kimm, Frankfurt am Main, Germany, assignors to Messer Griesheim GmbH., Frankfurt am Main, Germany, a corporation of Germany
Filed Dec. 20, 1966, Ser. No. 603,300
Claims priority, application Germany, Dec. 22, 1965, M 67,749
12 Claims. (Cl. 239—549)

ABSTRACT OF THE DISCLOSURE

The torch head has a pair of lips provided with communicating recesses which house a spacer having a plurality of oxygen passages over the entire width of the head and so dimensioned as to form a gap between the lips.

---

The invention relates to a flame scarfing torch head with an upper and a lower lip forming an interstice between them. The lips are fastened at their rear to the head part and have fuel gas orifice means across their entire width stretching along the interstice.

In flame scarfing torch heads of the type indicated above, which are preferably arranged in sequence one after the other, the reaction zone extends over a considerable width. The reaction gas here must emerge uniformly over the entire width of the reaction zone in order to obtain a grooveless, clean, and uniform processing of the surface. In flame scarfing torches of this type, the flame scarfing oxygen is conducted in the interstice between the lip parts. This interstice must therefore have precisely the same dimensions over the entire width of the flame scarfing torch head, so that the oxygen which is discharged from the interstice into the reaction zone flows uniformly throughout. For this purpose, in a flame scarfing torch head according to the German Patent 947,849, there are arranged spacing tracks between the lips which extend from back to front, i.e., in the direction of the oxygen flow, and are distributed at intervals from each other over the entire width of the torch head. By means of such spacing tracks both lip parts can be adjusted at the desired distance from each other, but the interstice remaining between them is subdivided into many small sections and the oxygen flow is accordingly subdivided into the corresponding number of streams. These spacing tracks do not reach the frontmost area of the interstice, so that before they are discharged these oxygen streams can again be united in the frontmost area of the interstice; but this union cannot take place in its entirety. In the flow section of the oxygen stream issuing from the interstice there are reflected spacing tracks. These irregularities in the oxygen supply result in irregularities in the flame scarfing treatment, particularly resulting in grooves in the surface to be treated.

An object of this invention is to provide a flame scarfing head of the above-named type wherein oxygen can be conducted evenly into the reaction zone even over relatively wide reaction zones.

The invention is characterized preferably by a rectangular spacer between the two lip parts. The spacer extends over the entire width and at its front interface has the oxygen orifice means. Additionally the spacer disposes the lips parallel to each other with a slot therebetween. By means of the spacer, both lip parts can thus be adjusted without difficulty—similarly to the spacing track of the known device. However, the spacer provided by the invention does not result in a subdivision of the slot, wherein the wide oxygen current section should be formed—in contrast to the spacing tracks of the known device. The oxygen current section can accordingly be formed in the desired manner in the slot undisturbed by any spacing means. While in the known flame scarfing torch head the inflow of the oxygen is determined by the arrangement and construction of the spacing tracks, which in turn is designated to hold the distance by the function of the spacers, in accordance with this invention the oxygen orifice means in the spacer can be shaped solely according to its purpose of allowing the oxygen to flow in according to the desired current section.

Another advantage of the invention is its structurally simple construction as compared to the known flame scarfing torch head, because according to the invention only a single spacing element is provided as compared to the many spacing elements of the known flame scarfing torch head. The spacer of the invention is also a considerably rougher and stronger structural element as is desirable in the interests of a rugged construction. Because of the relatively large spacer provided by the invention, it is possible to construct the assembly very simply in that the lip parts are always screwed on in one way at the spacer and in another way at the head part. Once these screwing operations are carried out, then no additional attachment of the spacer is required, since it is held between the two lip parts by the above-mentioned screw joint.

In most cases because of flow principles a certain, very slight strength is optimal for the slot, while for the spacer a greater strength should be chosen in order to accommodate the screw joints and/or the oxygen orifice means. A corresponding embodiment of the invention is characterized in that the spacer is stronger than the slot and that the lip parts are recessed in the bearing area of the spacer.

Oxygen supply can take place very simply by providing an oxygen conduit terminating in a transverse boring of the head extending over the entire head width and connecting means extending over the entire head width between the transverse boring and the oxygen orifice means. The connecting means may be a line of boring or slots. The slots can follow each other in sequence. Also, there may be a single continuous slot.

Accordingly, the oxygen orifice means can be constructed in the simplest manner as slots or borings in the central plane of the gap between the lip parts which extend vertically to the head width, i.e., from back to front, and which have connecting means attached thereto.

If the construction of a uniformly wide current section in the slot between the lip parts is made advantageous by the construction of the orifice means and the connecting means, then it is recommended to arrange side by side either very small borings or slots for these means, so that the flow section developed in these borings or slots can easily be converted to the desired current section.

For flame scarfing, various widths of flame scarfing torch heads are needed, depending on the work piece to be processed, when the entire work piece or parts thereof are to be flame sprayed at one time. For this reason it is already known to assemble several flame scarfing torch heads in an assembly-line fashion to form a flame scarfing unit. Flame scarfing torch heads according to the invention are particularly suitable for such an assembly-line type of joining together. It is sufficient for this purpose to provide connecting means at both sides of the lips over which the lip can be joined together in an aligned extension so that the gaps are aligned to form a long transversing gap or slot which is bounded by parallel sets of lips. In a corresponding manner, the spacers of the individual joined torch heads are then also aligned and with them the oxygen supply means, so that the relationship for an individual flame scarfing head holds true for such a flame scarfing unit. It is important in this connection that in the fitting together the individual parts be neatly adjusted to each other, so that no changes result at the seams in the slot and in the gas supply means. A corresponding construction of the arresting means is characterized by adjusting disks which fit into the slots.

The invention is illustrated by way of the attached drawings wherein:

FIG. 3 is a sectional view along the line III—III of FIG. 2; and

FIG. 4 is an exploded view of the torch shown in FIG. 1.

Figure 1:
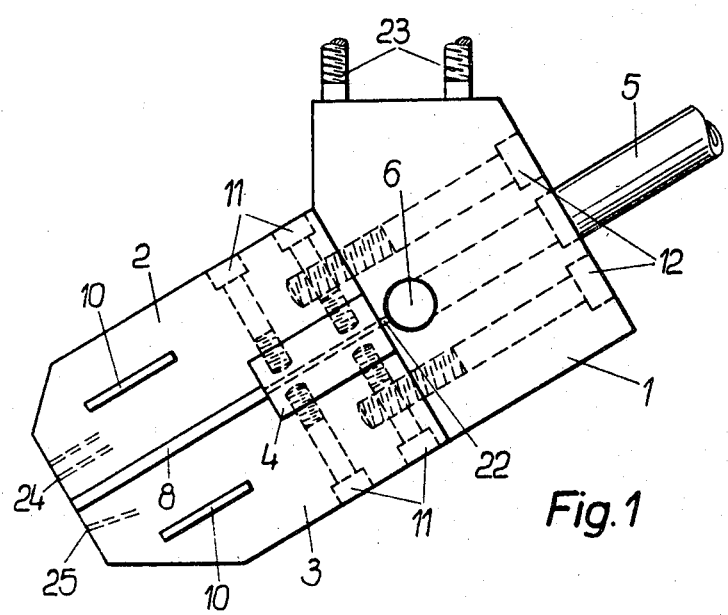
FIG. 1 is a side view of a flame scarfing torch head of this invention.

In the drawing the torch head 1 is provided with an upper lip 2, a lower lip 3, and a spacer 4. Both lip parts 2 and 3 have, as indicated in FIG. 4, in their rear portion a recess 20, 21, into which fits the spacer 4. The dimensions of the spacer 4, as shown by FIG. 1, are such that a gap 8 remains open by the spacer 4 between the lip parts 2 and 3. The surfaces of the lip parts 2 and 3 bounding slot 8 are parallel to each other, but they can also be constructed to be entirely or partially inclined to each other. As seen in FIG. 1, the lip parts are bolted together by means of bolts 11 with the spacer 4 arranged between lips 2, 3. To the rear of lips 2, 3 is screwed the torch head 1 by means of bolts 12. An oxygen conduit 5 terminates in a transverse boring 6 extending over the entire width of the head part 1. The spacer 4 has borings 30 (FIG. 4) extending along the oblong central plane, which borings are distributed over the entire head width at uniform intervals, parallel to each other and, as particularly shown in FIG. 3, are closely arranged to each other. These borings 30 communicate with the transverse boring 6 by means of connecting borings 22 which are aligned with borings 30. The various attaching bolts 23 are also illustrated in FIG. 1. The fuel gas orifice means 24, 25 are attached at the front of the lip parts 2, 3. In the drawing these fuel gas orifice means are indicated as rows of borings. The shape of these fuel gas orifice means may vary without departing from the spirit of the invention. For example, instead of the individual borings, slits can also be provided. It is important, however, that the fuel gas orifice means extend over the entire width of the reaction zone along slot 8, i.e., over the entire head width, and that the fuel gas supply takes place over the entire width as uniformly as possible. Instead of the fuel gas, a fuel gas oxygen mixture can also be emitted from these borings. It is also possible to arrange over the fuel gas borings still another row of borings for the heating oxygen.

Figure 2:
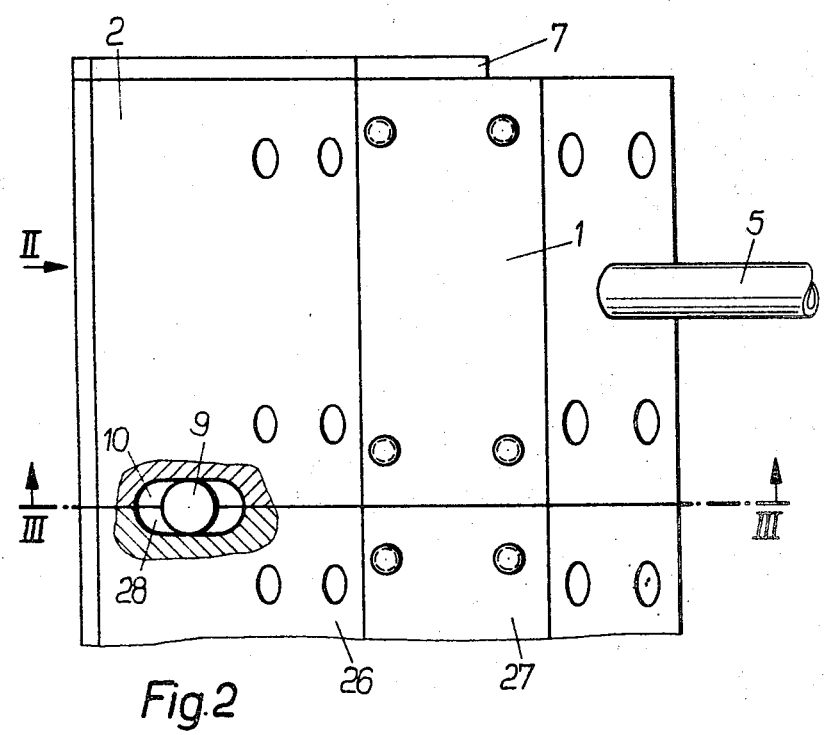
FIG. 2 is a top view of the flame scarfing torch head according to FIG. 1 having a further flame scarfing torch head attached thereto.

Two slots 10 (FIG. 1) are arranged in both sides of the lip parts 2 and 3. These slots are associated with the connecting means for connecting together several flame scarfing torch heads in the manner illustrated in FIGS. 2 and 3. FIGS. 2 and 3 show one flame scarfing torch head in its entirety and part of another head which is connected to it. The second head includes an upper lip 26 (corresponding to the lip part 2) and a slot 28 (corresponding to slot 10) which is arranged at the other side of the lip part. A corresponding slot (not shown) is arranged at the side of the upper and lower lip part but not used in the unit according to FIG. 2. Both slots 10 and 28, which are visible through the opening made there, are aligned together. An adjusting disk 9 is fitted in these two slots and in this manner holds both lip parts 2 and 26 thus connected together in a position aligned with each other. A corresponding connection (not shown) is also provided for both of the lower lip parts. In the same manner, further lip parts can be connected together with the accompanying head parts and spacers, to thereby result in any desired width of flame scarfing unit. The flame scarfing unit in its final assembly has a stop plate 7 at each of its outer sides. FIG. 2 shows only one of the stop plates 7. By means of the stop plate, slot 8 is shut off to the outside. The transverse borings 6 of the individual joined head parts can thus be constructed to be continuous and in alignment with each other, so that the admitted oxygen can be distributed over the entire width of the flame scarfing torch unit within the transverse boring 6. If the flame scarfing torch unit is not too wide, a single oxygen conduit feed pipe 5 is sufficient for the total oxygen supply. However, it is also possible to supply the oxygen at several points; if necessary to provide an oxygen conduit for each head part.

Obviously many variations and modifications of the invention are possible in light of the above description. It is therefore to be understood that within the scope of the appended claims the invention may be practiced otherwise than specifically described.

What is claimed is:

1. A flame scarfing torch head comprising a rear head portion, an upper and a lower lip attached at their rear to said head portion, an interstice between said upper and lower lip, fuel gas orifice means extending across the width of the front of said lips, oxygen orifice means at the rear of said interstice extending across the width of said lips, a spacer in said interstice maintaining said lips spaced apart leaving a plane-parallelly limited gap between the lips and said oxygen orifice means extending at the front of said spacer.

2. A torch head as set forth in claim 1 wherein said lips are bolted on one side to said spacer and on another side to said head portion.

3. A flame scarfing torch head as set forth in claim 1 wherein said interstice is formed by recesses in said lips, and said spacer being higher than the height of the gap between said lips.

4. A flame scarfing torch head as set forth in claim 1 wherein a transverse boring extends across said head portion, an oxygen supply passage communicating with said boring, and said oxygen orifice means leading from said boring.

5. A flame scarfing torch head as set forth in claim 4 wherein said oxygen orifice means includes a row of parallel bores between said spacer and said boring.

6. A flame scarfing torch head as set forth in claim 4 wherein said oxygen orifice means includes slot means between said spacer and said boring.

7. A flame scarfing torch head as set forth in claim 4 wherein said oxygen orifice means includes bores in said spacer disposed in the plane of the gap between said lips and vertically to the width of said head.

8. A flame scarfing torch head as set forth in claim 4 wherein said orifice means includes slot means in said spacer disposed in the plane of the gap between said lips and vertically to the width of said head.

9. A flame scarfing torch head as set forth in claim 1 wherein connecting means are on each side of said lips for attaching other torch heads thereto in aligned relationship to form a torch head unit.

10. A flame scarfing torch head as set forth in claim 9 including adjusting disks adjustable to said connecting means, said connecting means consisting of slots.

11. A flame scarfing torch head as set forth in claim 9 wherein stop plates are provided on the exposed sides of said torch head unit to close the gap between the aligned sets of lips.

12. A flame scarfing torch head as set forth in claim 1 in combination with a plurality of flame scarfing torch heads to form a nozzle unit, wherein said gap is extending across the whole width of the flame scarfing nozzle and is exclusively limited on the exposed sides of said unit by stop plates.

References Cited

UNITED STATES PATENTS

| | | | |
|---|---|---|---|
| 2,267,405 | 12/1941 | Jones et al. | 158—27.4 |
| 2,295,522 | 9/1942 | Shorter | 239—549 |
| 2,532,385 | 12/1950 | Anderson | 239—549 |
| 2,622,084 | 12/1952 | Moesinger | 158—27.4 |

FOREIGN PATENTS 153,327   2/1956   Sweden.

EVERETT W. KIRBY, *Primary Examiner.*